UNITED STATES PATENT OFFICE.

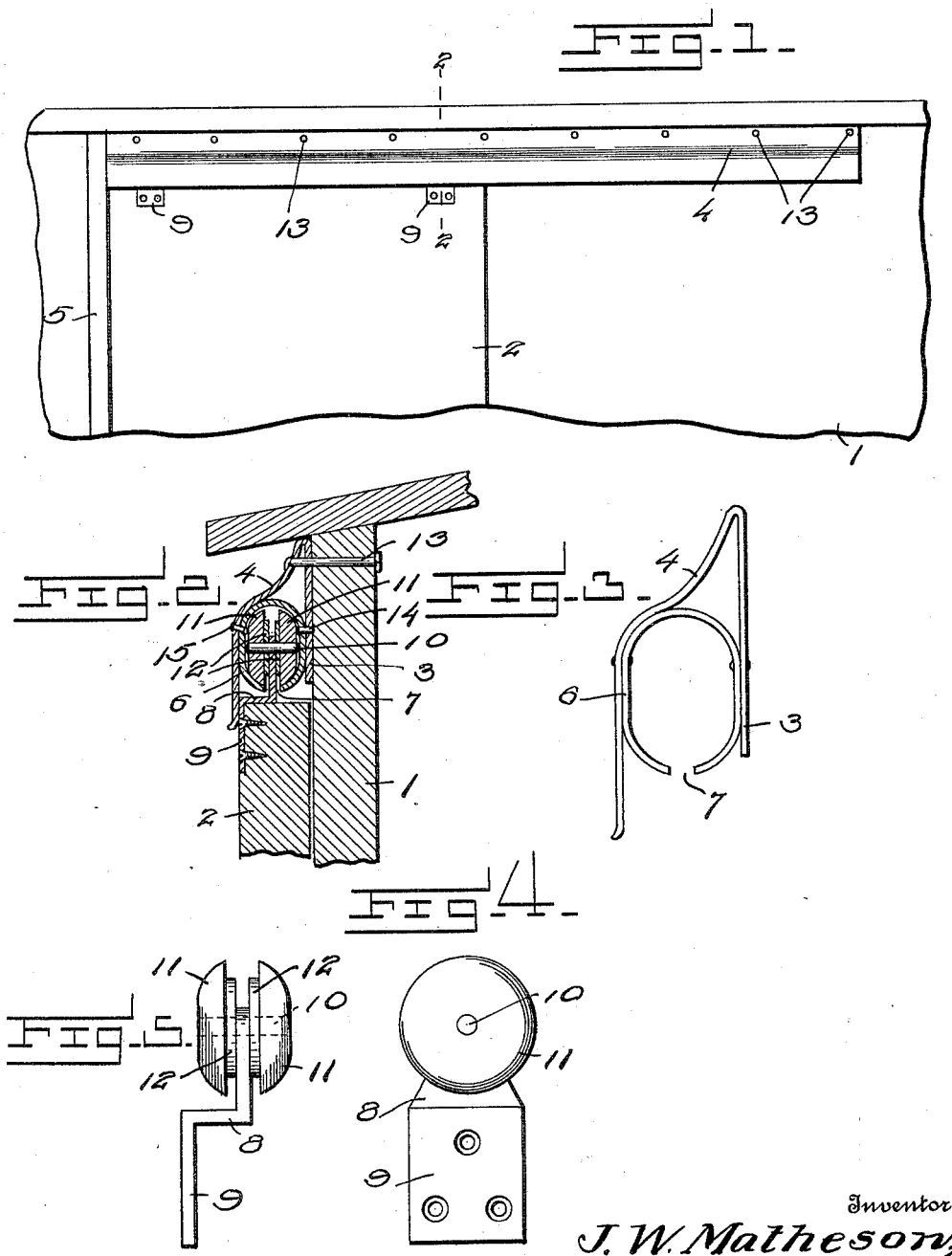

JOHN WILLIAM MATHESON, OF AMARILLO, TEXAS.

DOOR-HANGER.

1,051,426.  Specification of Letters Patent.  Patented Jan. 28, 1913.

Application filed February 15, 1911. Serial No. 608,717.

*To all whom it may concern:*

Be it known that I, JOHN W. MATHESON, a citizen of the United States, residing at Amarillo, State of Texas, have invented certain new and useful Improvements in Door-Hangers, of which the following is a specification.

This invention relates to improvements in door hangers, and has for its object to provide a simple and efficient hanger for sliding doors which will prevent the same from swinging laterally.

Other objects and advantages of my improved construction will be apparent from the following description taken in connection with the drawings, and it will be understood that I may make any changes in the construction within the scope of the claim without departing from the spirit of the invention.

Figure 1 represents a side elevation of a car equipped with my improved combined shield and hanger. Fig. 2 represents a sectional view on the line 2—2 of Fig. 1. Fig. 3 represents an end view of the track and support. Fig. 4 represents a side elevation of the supporting rollers and bracket depending therefrom. Fig. 5 represents an end view of the parts shown in Fig. 4.

In the drawings, the numeral 1 designates a car having the customary sliding door 2. Secured to the car above its doorway is the vertical plate 3 having the reversely bent and outwardly inclined portion 4 which extends down lower than the plate or portion 3 but is spaced a distance therefrom. The plate extends along the side of the car to cover the track on which the door slides.

Any desired track may be used with my improved shield and said shield may be secured to an ordinary car over the track already thereon, but my invention is particularly adapted for use with the track forming member most clearly shown in Figs. 2 and 3. By reference to these figures it will be seen that the plate from which the track is formed is bent into the shape of a slightly flattened cylinder 6 having the slot 7 in the lower side thereof.

Secured to the door 2 are a plurality of Z-shaped brackets 8 having an enlarged lower end 9 secured to the outer face of the door, the intermediate bar of the Z-plates lying along the top of the door and extending to the middle of the door, while the other portion of the plate extends upward through the slot 7 in the track forming member 6. Journaled in the upper end of each of said plates 8 is a shaft or axle 10 having a hemispherical shaped wheel or roller 11 secured to each end and held spaced from the plate 8 by a washer 12.

From the foregoing description taken in connection with the drawings the construction of the various parts of my invention will be readily understood and it will be seen that the bolts 13 passing through the upper ends of the shield member and of the car body serve to secure the shield member in position, while the rivets 14 passing through one side of the member 6 and the plate 3 secure the track to the shield at one point and the rivets 15 passing through the portion 4 of the shield and the other side of the member 6 secure and support that side in elevated position. It will be further observed that the track formed by the member 6 is entirely closed except for the slot 7 in the bottom thereof and that consequently it is practically impossible for dirt to get therein to interfere with the operation of the rollers of the brackets, while the shield extending over the said track and also over the door serves both to further shield the track member and to close the space between the track and the car door to prevent either dirt or moisture being driven into the car through the said space.

I claim:

In a car door hanger, the combination with a plurality of Z-shaped brackets, wheels rotatably mounted upon the upper arms thereof, the lower ends of said brackets being secured to the upper outer edge of the door, a vertical plate secured to the car, said plate terminating in a second vertical plate, a cylindrical track supported between the plates and having a longitudinal slot formed in its lower portion and through which the upper arms of the brackets pass, said wheels being adapted to travel within the track, the upper ends of the lower arms of said brackets resting against the lower edge of the second plate, whereby the door is prevented from swinging laterally.

In testimony whereof I affix my signature, in the presence of two witnesses.

JOHN WILLIAM MATHESON.

Witnesses:
A. A. LUMPKIN,
SAM PRUERRILL.

Copies of this patent may be obtained for five cents each, by addressing the "Commissioner of Patents, Washington, D. C."